United States Patent [19]

Boardman

[11] 4,244,915

[45] Jan. 13, 1981

[54] ROTARY THERMOFORMING PROCESS AND APPARATUS

[75] Inventor: Bruce B. Boardman, Wilmington, Del.

[73] Assignee: Hercules Incorporated, Wilmington, Del.

[21] Appl. No.: 974,453

[22] Filed: Dec. 29, 1978

[51] Int. Cl.³ ............... B29C 17/04; B29C 17/10
[52] U.S. Cl. .................. 264/551; 425/292; 425/296; 425/326.1; 425/342.1; 425/387.1; 425/388
[58] Field of Search ............ 264/544, 547, 549, 550, 264/551, 553, 555; 425/326.1, 342.1, 387.1, 388, 292, 296, 302.1

[56] References Cited

U.S. PATENT DOCUMENTS

| | | | |
|---|---|---|---|
| 3,234,594 | 2/1966 | Winstead | 425/342.1 X |
| 3,235,639 | 2/1966 | Knowles | 264/547 |
| 3,816,585 | 6/1974 | Edwards | 264/551 X |

*Primary Examiner*—Jan H. Silbaugh
*Attorney, Agent, or Firm*—Joshua W. Martin, III

[57] ABSTRACT

The invention is a process and apparatus for continuously thermoforming plastic containers wherein opposed co-rotating discs process a molten sheet of thermoplastic material having a wedge-shaped cross-section, said discs transporting said thermoplastic material through a plug-assisted pressure and/or vacuum forming station, a shear station and a part removal station.

3 Claims, 8 Drawing Figures

ROTARY THERMOFORMING PROCESS AND APPARATUS

BACKGROUND OF THE INVENTION

This invention relates to process and apparatus for forming containers from extruded sheet thermoplastic material with the utilization of plug-assisted pressure and/or vacuum forming techniques. It is known in the art to form tub-like containers by continuous rotary means from sheet stock such as shown in U.S. Pat. No. 3,027,596. The instant invention likewise provides thermoforming apparatus that rotates about a horizontal axis but, unlike the previously mentioned patent, performs thermoforming on vertically extruded thermoplastic material in a vertical plane between opposed rotating discs. Product uniformity has been made possible by the utilization of a wedge-shaped thermoplastic feedstock to compensate for the variation in tangential speed of the material being processed. U.S. Pat. Nos. 3,181,202, 3,518,725 and 3,771,938 illustrate rotary drum thermoforming wherein flat feedstock is fed to the surface of a rotating thermoforming drum. The instant invention differs from all of the above-mentioned patents in that molten sheet is extruded downwardly in the vertical direction between substantially parallel plates parallel to their plane of rotation and normal to their axis of rotation. Further, the instant invention does not use preformed sheet, which is reheated and fed horizontally onto the surface of a thermoforming drum as shown in the above-mentioned references. U.S. Pat. Nos. 3,578,735 and 3,600,753 illustrate flat bed plug-assisted thermoforming apparatus. These types of devices likewise require horizontal sheet stock and when used with such materials as polypropylene, which is highly plastic at thermoforming temperatures, require special devices to tenter the material and prevent it from stretching before thermoforming. The instant invention avoids material handling problems encountered in all of the above-mentioned patents by extruding a sheet of material vertically downwardly between vertical discs which rotate about a horizontal axis. By this means, the effect of gravity on the material is utilized beneficially rather than creating a problem that must be compensated for. Because the tangential speed of any point on the disc varies from the center of rotation to the extreme periphery of the forming discs, the sheet of material that is extruded is wedge-shaped in cross-section.

OBJECTS OF THE INVENTION

It is a primary object of the present invention to provide process and apparatus for thermoforming thermoplastic sheets into containers at very high speeds.

It is another object of the instant invention to pressure thermoform containers directly from molten thermoplastic sheet material.

It is yet another object of the instant invention to provide apparatus that can thermoform plastic articles utilizing high forming pressure to achieve high quality surface finish on the articles.

SUMMARY OF THE INVENTION

It is the purpose of the instant invention to provide apparatus for continuously pressure/vacuum thermoforming plastic containers using the direct application of molten thermoplastic sheet produced by a sheet die. To accomplish this purpose, the instant invention provides a molding machine having two opposed discs rotating in unison on a common axis at a point adjacent to an extrusion die admitting a molten sheet of thermoplastic material vertically downwardly between and to one quadrant of the discs. Mold cavities are contained within one of said discs and opposing the said cavities movable plug assemblies are mounted in said other disc. The movable plug assemblies extend during the molding cycle to plug the molten sheet material into the cavities, thus effecting an air-tight seal around the cavities at which point compressed air and/or vacuum is applied internally into the cavities to thermoform the material. Also contained within the co-rotating discs are shear tools which are a part of the plug assemblies and function to shear the molded parts from the plastic sheet to form a finished container.

DESCRIPTION OF THE PREFERRED EMBODIMENT

Figure 1:
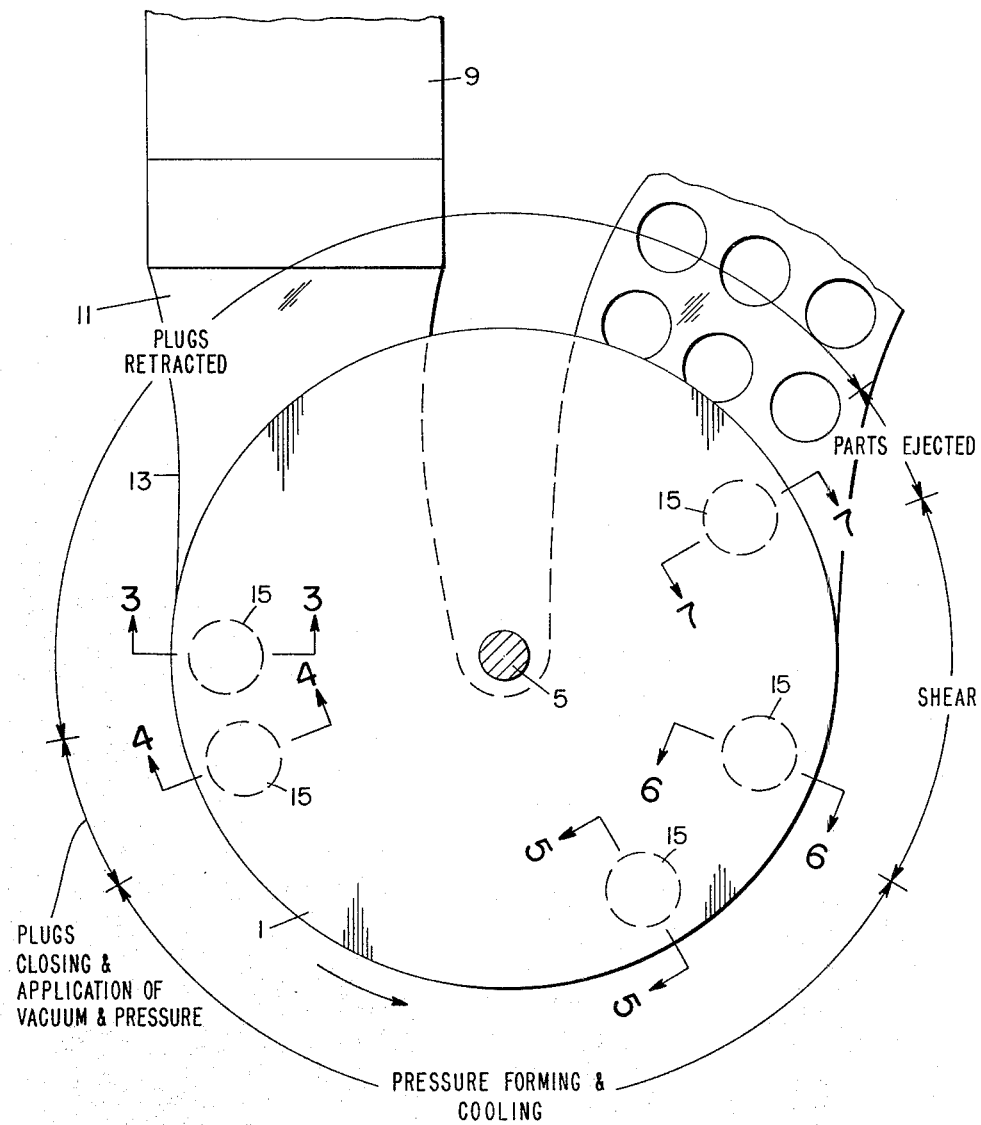
FIG. 1 is a front view of the thermoforming apparatus of the instant invention.
Figure 2:
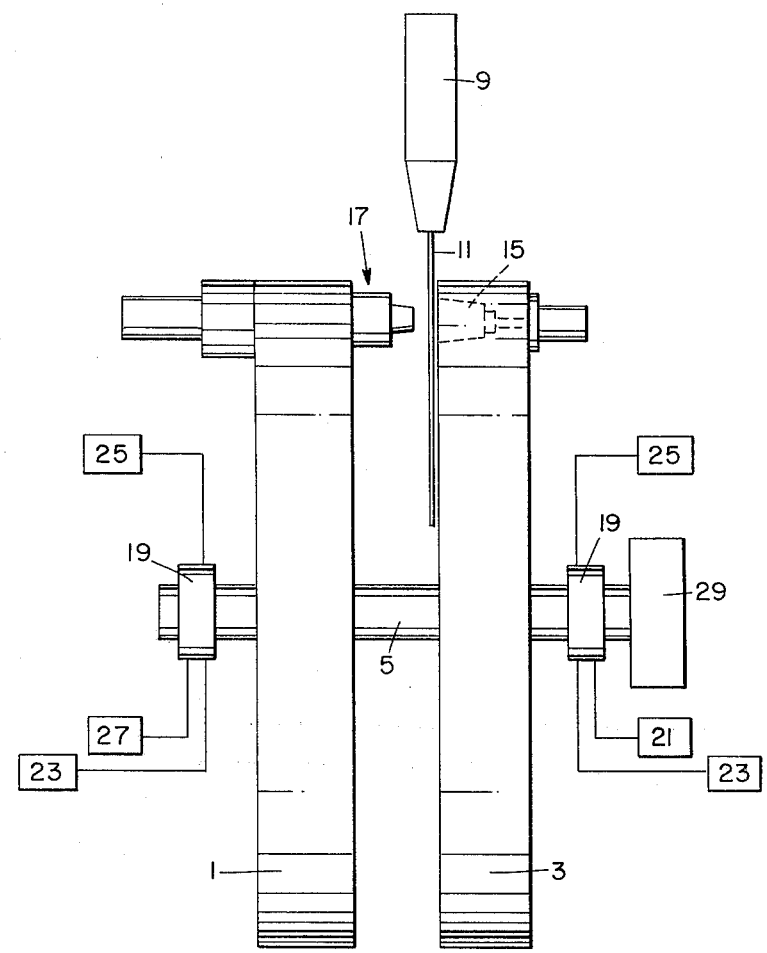
FIG. 2 is a side view of the apparatus shown in FIG. 1.

Referring now to the drawings, there is shown a machine in accordance with the present invention for producing thin wall plastic containers. FIGS. 1 and 2 show co-rotating discs 1 and 3 which revolve around spindle 5 in the direction 7 (see FIG. 1). Extrusion die 9 extrudes a molten sheet of thermoplastic material 11 between the discs 1 and 3. The molten sheet 11 is wedge-shaped in cross-section and is thickest at edge 13. The wedge-shaped cross-section provides additional material across the radius of discs 1 and 3 to accommodate stretching of the material caused by the tangential velocity differential across the radii of the discs to thereby present a uniform thickness of formable material to the surface of said discs, the thermoforming cavities and their respective plugs.

FIG. 1 illustrates in phantom lines 15 one of several cavity geometric lay-outs that are useful in the instant invention. The exact configuration of the cavities and their lay-out with respect to spindle 5 and extrusion die 9 will depend upon the desired container. The cavities 15 are interchangeable for production and construction purposes. Only one cavity 15 is illustrated in FIG. 2, along with its complementary movable plug 17. Manifolding means 19 are integral with spindle 5 to provide discs 1 and 3 with vacuum, cooling fluid, compressed air and high pressure hydraulic fluid from external schematically illustrated sources 21, 23, 25 and 27, respectively. Spindle 5 is rotated by rotational means 29.

Figure 3:
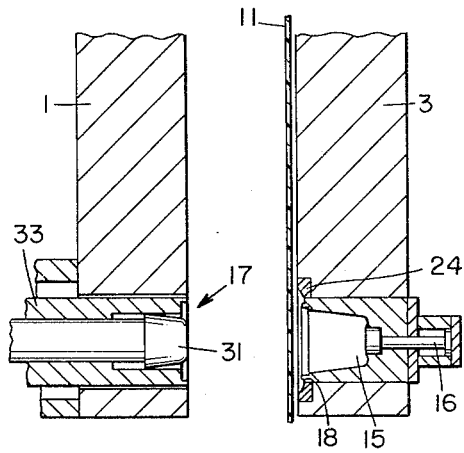
FIG. 3 is a partial sectional view taken along line 3—3 of FIG. 1.

FIG. 3 is a sectional view taken along section lines 3—3 of FIG. 1 which illustrates a more detailed view of a plug 17 and a cavity 15 as arranged in retracted position in discs 1 and 3 respectively. Cavity 15 is connected to vacuum source 21, air source 25 and cooling fluid source 23 as they appear in FIG. 2. Plug 17 is connected to air source 25 and cooling fluid source 23. Plug 17 has contact area 31 and shear tool 23 mounted concentric with respect to contact area 31. Shear tool 33 is connected to hydraulic fluid source 27. Shear tool 33 moves axially and at a slower rate with respect to plug contact area 31 as will be discussed later. The exact details of connection to such sources have been omitted in FIGS. 3–7 for purposes of clarity.

Figure 4:
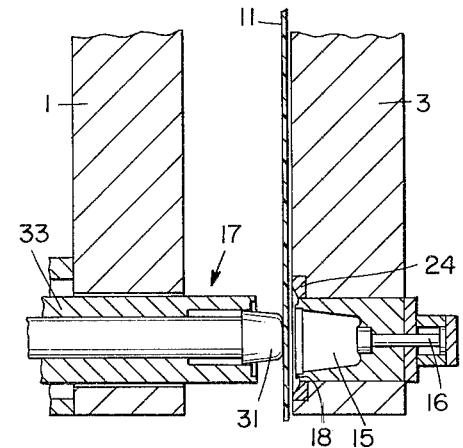
FIG. 4 is a partial sectional view taken along line 4—4 of FIG. 1.

In FIG. 4, plug 17 is closing with respect to cavity 15 and vacuum via vacuum source 21 is being applied to the inner surface of disc 3 to pull the molten sheet 11 into contact with disc 3. Specifically, vacuum is applied within cavity 15 through knock out pin 16 and on the surface of disc 3 at the circumference of cavity 15 as noted generally at 18.

Figure 5:
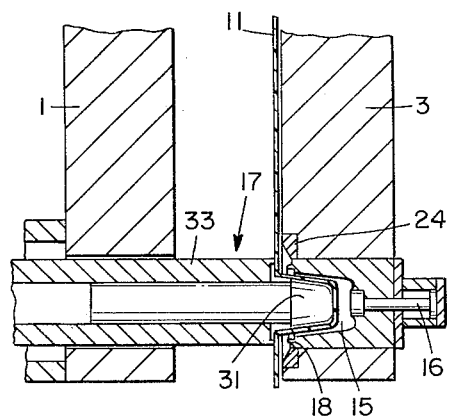
FIG. 5 is a partial sectional view taken along line 5—5 of FIG. 1.

In FIG. 5, contact area 31 has forced molten sheet 11 into cavity 15. Shear tool 33 has been moved at a linear speed slower than contact area 31 and is shown in FIG. 5 to be in contact with sheet 11. Plug 17 extends during the molding cycle as shown in FIG. 5 to "plug" the molten sheet and shear tool 33 is about to seat upon the opening of cavity 15 to effect an air-tight seal around the cavity. Once sealed, vacuum is applied through knock out pin 16 via passage 22 to draw the molten sheet 11 into the cavity 15. Compressed air from source 25 may optionally be applied internally through the plug 17 to force the molten sheet 11 in close contact with the mold surfaces. In this way, vacuum in the cavities 15 and/or pressure from the plugs 17 will cause the molten material to come into absolute contact with the inside surfaces of the cavity 15. Contact area 31 and cavity 15 are fluid cooled to harden sheet 11.

Figure 6:
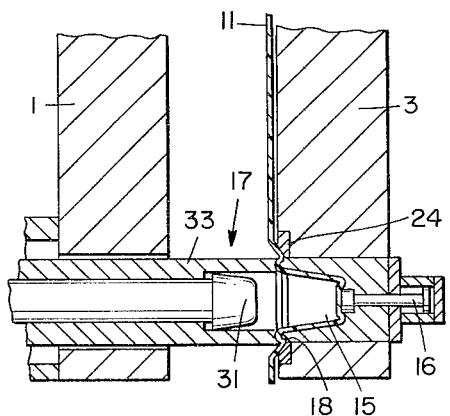
FIG. 6 is a partial sectional view taken along line 6—6 of FIG. 1.
Figure 7:
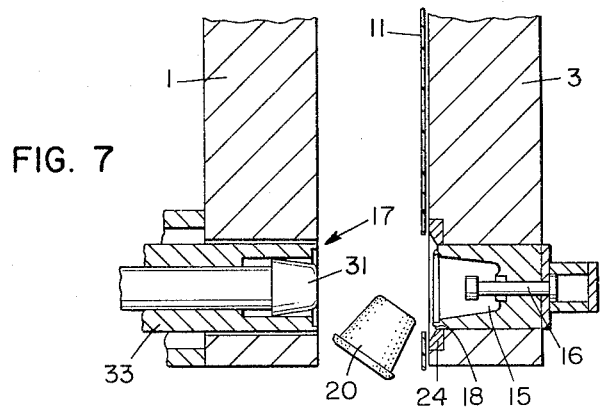
FIG. 7 is a partial sectional view taken along line 7—7 of FIG. 1.

With reference to FIG. 6, near the end of the molding cycle shear tool 33 is forced further against the sheet 11 and opposing disc 3, thus shearing the molded part from the plastic sheet. Plug 17 then retracts, as shown in FIG. 7, and the formed sheared part and sheared sheet 11 are subjected to removal means such as knock out pin 16 and means to strip the sheared sheet of material. The sheared sheet may be wound up or transferred directly to a grinder for reprocessing. It is within the scope of the invention to use compressed air alone to dislodge the finished container 20. In such a situation, the knock out pin 16 would be eliminated and an opening would be provided for vacuum or compressed air as desired. Contact area 31 in FIG. 6 is retracted while shear tool 33 severs sheet 11. The molding cycle as discussed above is repeated in a continuous fashion as the discs 1 and 3 rotate through 360°.

Figure 8:
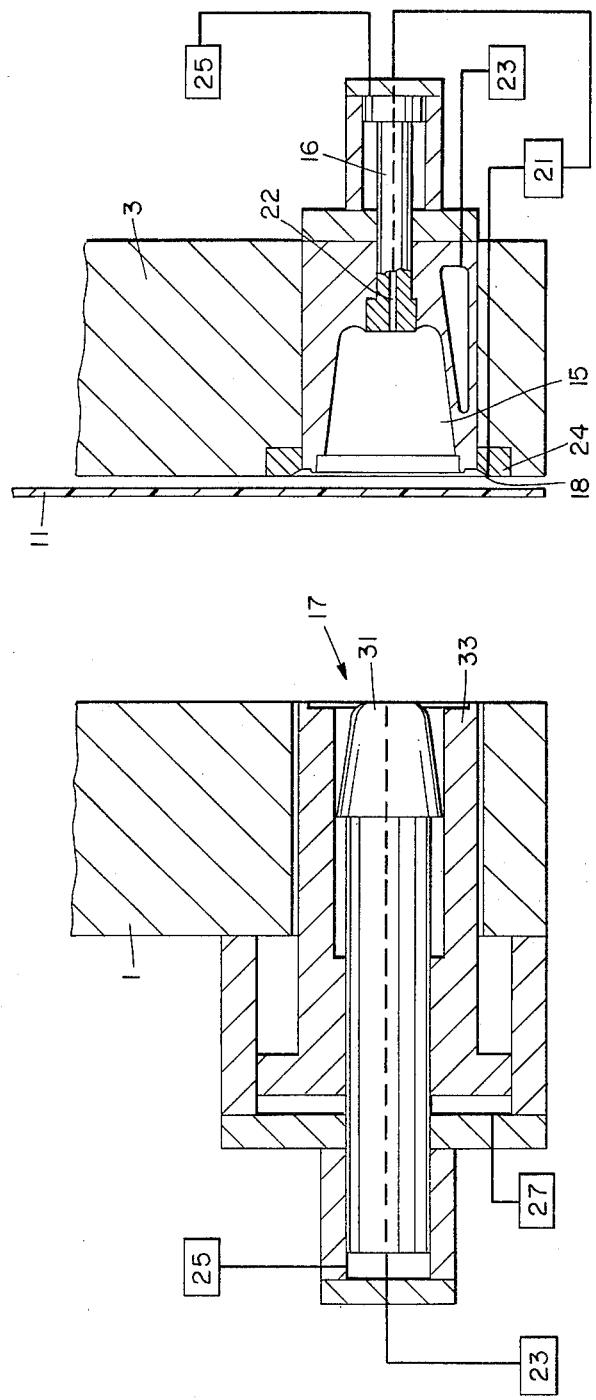
FIG. 8 is an enlarged sectional view similar to FIG. 3 taken along line 3—3 of FIG. 1.

FIG. 8 illustrates a detailed cross-section of discs 1 and 3. The specific manifolding of vacuum cooling fluid, compressed air and high pressure fluid to discs 1 and 3 are not shown in detail. The connection of such fluids is shown schematically in the instant invention as rotatable fluid connectors and manifolding means are well known in the art. With reference to FIG. 8, plug 17 has a contact area 31 that is fluid cooled by cooling fluid source 23. Contact area 31 is moved by compressed air source 25. Plug 17 also has a shear tool 33 that is actuated by high pressure hydraulic fluid source 27.

Cavity 15 is cooled by cooling fluid source 23. Vacuum is provided by vacuum source 21 to the surface of disc 3 at the circumference 18 of cavity 15. Vacuum is also connected to knock out pin 16 via passage 22. Cavity 15 is provided with a replaceable shear surface 24 that is complementary with shear tool 33.

It will be understood that numerous changes may be made in the design and construction hereof without departing from the spirit and scope of the invention.

What is claimed is:

1. A process for thermoforming plastic containers comprising:
   extruding a sheet of thermoplastic material having a wedge-shaped cross-section vertically downwardly adjacent to the surface of at least one rotating disc and normal to its axis of rotation wherein the planar surface of said sheet is substantially parallel to the surface of said rotating disc;
   contacting said sheet, without utilization of any clamping means, with the surface of said disc wherein said disc is rotating in a vertical plane about a horizontal axis, said wedge-shaped cross-section of said sheet accommodating stretching caused by the arcuate movement of said sheet and the accompanying differential in tangential velocity across the radius of said disc and across the width of said sheet, said sheet being progressively thicker across its width toward the outer edge of said disc to provide additional material across the width of said sheet for presentation of a substantially uniform thickness of said sheet along the surface of said disc immediately prior to the step of;
   plugging portions of said sheet into mold cavities contained within said disc;
   thereafter applying a pressure differential across said plugged portion of said sheet forcing said plugged portion of said sheet into intimate contact with said mold cavities;
   cooling said sheet;
   shearing said sheet at the periphery of said mold cavities to form a finished container; and
   stripping said sheet in its sheared condition and ejecting said finished containers from said disc.

2. Apparatus for thermoforming plastic containers comprising:
   an extruder die to extrude a sheet of thermoplastic material having a wedge-shaped cross-section vertically downwardly;
   co-rotating first and second coaxial discs positioned below said extruder die to receive said sheet adjacent to the interior surfaces of said discs wherein the planer surface of said sheet is substantially parallel to the surfaces of said disc;
   said wedge-shaped cross-section of thermoplastic material thereby eliminating the need for clamping means by accommodating stretching caused by the arcuate movement of said sheet and the accompanying differential in tangential velocity across the radius of said disc and across the width of said sheet;
   mold cavities contained within said first disc;
   plug means connected to said second disc, said plug means being complimentary with said mold cavities to plug portions of said sheet into said cavities as said disc rotate;
   pressure differential means connected to said discs to force said sheet further into intimate contact with said mold cavities after said sheet is plugged into said cavities;
   cooling means connected to said mold cavities to harden said sheet while such sheet is in contact with said mold cavities;

shear means concentrically mounted with respect to said plug means for shearing said sheet at the periphery of said mold cavities after said sheet is cooled to form finished containers; and removal means connected to said discs to knock out said finished containers and to strip away said sheet, said plug means, said pressure differential means, said cooling means, said shear means and said removal means each being operated sequentially as said discs rotate through 360° to continuously form containers.

3. A process for thermoforming plastic containers comprising:

extruding a sheet of thermoplastic material, having a wedge-shaped cross-section, vertically and downwardly between and adjacent to the surfaces of a first and a second rotating disc, said rotating discs being parallel, opposed and rotating in unison on a common horizontal axis, wherein the planar surface of said sheet is substantially parallel to the interior surfaces of said first and said second rotating discs, wherein said first rotating disc contains mold cavities spaced around its periphery and said second rotating disc contains plug means complimentary to said mold cavities of said first rotating disc, said plug means spaced around the periphery of said second rotating disc;

contacting said sheet, without utilization of any clamping means, with the surface of said first disc, said wedge-shaped cross-section of said sheet accommodating stretching caused by the arcuate movement of said sheet and the accompanying differential in tangential velocity across the radius of said first disc and across the width of said sheet, said sheet being progressively thicker across its width toward the outer edge of said first disc to provide additional material across the width of said sheet for presentation of a substantially uniform thickness of said sheet along the surface of said first disc immediately prior to the step of;

plugging portions of said sheet, utilizing plug means of said second disc, into mold cavities contained within said first disc;

thereafter applying a pressure differential across said plugged portion of said sheet forcing said plugged portion of said sheet into intimate contact with said mold cavities;

cooling said sheet;

shearing said sheet at the periphery of said mold cavities to form a finished container; and stripping said sheet in its sheared condition and ejecting said finished containers from said first disc.

* * * * *